(12) United States Patent
Hamatani et al.

(10) Patent No.: US 10,738,366 B2
(45) Date of Patent: Aug. 11, 2020

(54) ELECTRIC-RESISTANCE WELDED STEEL PIPE

(71) Applicant: NIPPON STEEL & SUMITOMO METAL CORPORATION, Tokyo (JP)

(72) Inventors: Hideki Hamatani, Tokyo (JP); Keinosuke Iguchi, Tokyo (JP); Masakazu Ozaki, Tokyo (JP); Takaaki Fukushi, Tokyo (JP); Takuya Asano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 504 days.

(21) Appl. No.: 15/022,004

(22) PCT Filed: Dec. 20, 2013

(86) PCT No.: PCT/JP2013/084255
§ 371 (c)(1),
(2) Date: Mar. 15, 2016

(87) PCT Pub. No.: WO2015/092916
PCT Pub. Date: Jun. 25, 2015

(65) Prior Publication Data
US 2016/0222480 A1 Aug. 4, 2016

(51) Int. Cl.
*C22C 38/58* (2006.01)
*C22C 38/48* (2006.01)
(Continued)

(52) U.S. Cl.
CPC ............. *C21D 8/10* (2013.01); *C21D 8/0226* (2013.01); *C21D 8/0263* (2013.01);
(Continued)

(58) Field of Classification Search
CPC . C21D 7/12; C21D 8/10; C21D 8/105; C21D 9/08; C21D 9/085; C21D 9/10;
(Continued)

(56) References Cited

U.S. PATENT DOCUMENTS

2003/0217795 A1 11/2003 Asahi et al.
2007/0193666 A1* 8/2007 Asahi ..................... B32B 15/01
148/654

(Continued)

FOREIGN PATENT DOCUMENTS

CA 2808119 A1 10/2012
CA 2832021 A1 * 2/2013 ........... C21D 8/0226
(Continued)

OTHER PUBLICATIONS

International Search Report for PCT/JP2013/084255 dated Mar. 11, 2014.
(Continued)

*Primary Examiner* — Vanessa T. Luk
(74) *Attorney, Agent, or Firm* — Birch, Stewart, Kolasch & Birch, LLP

(57) ABSTRACT

The present invention provides electric-resistance welded steel pipe optimal for applications such as production of shale gas which is comprised of steel having a chemical composition which contains, by mass %, respectively, C: 0.08 to 0.18%, Si: 0.01% to 0.50%, Mn: 1.30 to 2.1%, Al: 0.001 to 0.10%, Nb: 0.005 to 0.08%, and Ti: 0.005 to 0.03%, is limited to N 0.008% or less, P: 0.020% or less, and S: 0.010% or less, and has a balance of Fe and unavoidable impurities, wherein a structure at a center part of thickness is 40% to 70% by area of ferrite phase having a circle-equivalent diameter of 1.0 μm to 10.0 μm and a balance of a low temperature transformation phase comprising a bainite phase, and Ceq satisfies 0.32≤Ceq≤0.60.

8 Claims, 6 Drawing Sheets

(51) Int. Cl.
| | |
|---|---|
| C22C 38/50 | (2006.01) |
| C22C 38/14 | (2006.01) |
| C22C 38/38 | (2006.01) |
| C22C 38/12 | (2006.01) |
| C21D 8/10 | (2006.01) |
| C21D 9/08 | (2006.01) |
| C21D 8/02 | (2006.01) |
| C22C 38/00 | (2006.01) |
| C22C 38/02 | (2006.01) |
| C22C 38/04 | (2006.01) |
| C22C 38/42 | (2006.01) |
| C22C 38/44 | (2006.01) |
| C22C 38/46 | (2006.01) |
| C22C 38/26 | (2006.01) |
| C21D 8/04 | (2006.01) |
| C22C 38/16 | (2006.01) |
| C22C 38/28 | (2006.01) |
| C22C 38/08 | (2006.01) |
| C22C 38/06 | (2006.01) |
| F16L 9/17 | (2006.01) |
| C21D 9/50 | (2006.01) |
| B23K 35/30 | (2006.01) |

(52) U.S. Cl.
CPC ............ *C21D 8/0426* (2013.01); *C21D 9/08* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/28* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/17* (2013.01); *B23K 35/30* (2013.01); *C21D 9/50* (2013.01); *C21D 2211/002* (2013.01); *C21D 2211/005* (2013.01)

(58) Field of Classification Search
CPC ... C21D 9/12; C21D 9/14; C21D 9/50; C21D 9/505; C21D 2211/002; C21D 2211/005; F16L 9/17
See application file for complete search history.

(56) References Cited

U.S. PATENT DOCUMENTS

| | | | |
|---|---|---|---|
| 2008/0286504 A1 | 11/2008 | Asahi et al. | |
| 2009/0025835 A1* | 1/2009 | Hara | C22C 38/02 148/521 |
| 2009/0120541 A1* | 5/2009 | Shimamura | C21D 8/02 148/593 |
| 2010/0051143 A1 | 3/2010 | Beppu | |
| 2011/0139315 A1* | 6/2011 | Nakagaito | C21D 1/25 148/533 |
| 2012/0031532 A1 | 2/2012 | Ishikawa et al. | |
| 2013/0092280 A1 | 4/2013 | Sawamura et al. | |

FOREIGN PATENT DOCUMENTS

| | | | |
|---|---|---|---|
| CA | 2881372 A1 | | 4/2014 |
| EP | 0494448 A1 | | 7/1992 |
| EP | 1437422 A1 | | 7/2004 |
| EP | 2 752 499 A1 | | 7/2014 |
| JP | 2006-283147 A | | 10/2006 |
| JP | 2006283147 A | * | 10/2006 |
| JP | 2009-57620 A | | 3/2009 |
| JP | 5293903 B1 | | 9/2013 |
| KR | 2003-0081050 A | | 10/2003 |
| WO | WO 2005/080621 A1 | | 9/2005 |

OTHER PUBLICATIONS

Canadian Office Action, dated Mar. 7, 2017, for corresponding Canadian Application No. 2,923,586.
Korean Office Action and English translation, dated Mar. 16, 2017, for corresponding Korean Application No. 10-2016-7007945.

* cited by examiner

ELECTRIC-RESISTANCE WELDED STEEL PIPE

TECHNICAL FIELD

The present invention relates to electric-resistance welded steel pipe which has high strength and high yield ratio and is optimal for application as oilfield pipe such as for the production of shale gas.

BACKGROUND ART

Shale gas, an unconventional type of natural gas which is produced from other than usual oilfields or gasfields, is a natural gas which is trapped in an extremely hard layer of rock, that is, a layer of shale, hundreds to thousands of meters below the surface. To extract shale gas, it is necessary to hydraulically fracture the extremely hard shale layer and collect the gas which had been trapped inside the rock layer from deep underground, so higher strength is being sought from steel pipe which is used for production of shale gas.

As the high strength steel pipe for production of shale gas, steel pipe which has a strength equivalent to the API standard 5CT P110 (below, referred to as "P110") (yield stress YS: 758 to 965 MPa, tensile strength TS: 862 MPa or more) is generally being used. To secure such strength, after pipe manufacturing, the steel pipe as a whole is quenched and tempered. However, in order to cut the cost of shale gas production, demand for electric-resistance welded steel pipe which has high strength and which can be used in a state of being as-formed as-formed into a pipe without heat treatment after pipe manufacturing (omitting the quenching and tempering) has been increasing.

Electric-resistance welding forming (ERW forming) of high strength steel pipe becomes difficult as the tensile strength (TS) becomes higher. Therefore, it is desirable to increase the ratio of the yield strength (YS) and TS, that is, the yield ratio (YS/TS, below referred to as the "YR") to obtain the targeted YS with a low TS so as to secure the formability. However, if forming high strength steel plate by ERW forming, due to the Bauschinger effect, the yield ratio in the rolling direction (L direction) easily falls. In particular, in steel with dual-phase structure, the Bauschinger effect remarkably appears, so the yield ratio easily falls.

PLT 1 discloses electric-resistance welded steel pipe which utilizes work-hardening to secure a strength equivalent to P110 and which enables elimination of heat treatment after pipe manufacturing. This uses not dual-phase steel, but steel plate of a uniform bainite structure. That is, it discloses to use a cooling rate $V_{C90}$ which provides a hardness equivalent to a 90% martensite structure as estimated from the C content as an indicator of the hardenability and to control the $V_{C90}$ to a suitable range and realize a uniform bainite structure to obtain electric-resistance welded steel pipe which has high strength and high yield ratio.

Further, according to PLT 1, in low carbon boron steel, a uniform bainite structure is formed, the Bauschinger effect is small, the YR becomes high, and a YS which satisfies P110 is obtained by a hot rolled steel plate having a low TS. PLT 1 demonstrates that a strength of this standard can be realized.

CITATION LIST

Patent Literature

PLT 1: International Publication No. WO2012/144248

SUMMARY OF INVENTION

Technical Problem

According to the electric-resistance welded steel pipe which is disclosed in PLT 1, formation of polygonal ferrite is suppressed by controlling the indicator $V_{C90}$ of hardenability and lowering the coiling temperature after hot rolling so that a uniform bainite structure is obtained. However, this electric-resistance welded steel pipe requires the addition of a trace amount of boron (B) (0.0005 mass % to 0.0030 mass %) to obtain these effects. B has the effect of improving the hardenability and strength of steel pipe, but even if more than a certain amount is added, the effect becomes saturated. B is inexpensive in price, but the range of manufacturing conditions where its properties are stably obtained is narrow and therefore fine care is required at the time of use. In particular, in steel which realizes its properties by hot rolling alone without quenching and tempering, manufacture under suitable conditions of hot rolling is necessary.

The present invention was made in consideration of the above-mentioned actual conditions and has as its object to provide electric-resistance welded steel pipe which has a P110 equivalent strength and yield stress and a method of production of the electric-resistance welded steel pipe, wherein the strength is secured by making the C content relatively high while not containing B and without heat treatment after pipe manufacturing.

Solution to Problem

In steel where the C content is made relatively high and B is not added, it is difficult to realize a uniform structure of bainite and it results in forming ferrite. For this reason, the inventors studied how to achieve the object in dual-phase steel of ferrite and bainite.

If making a dual-phase structure, the Bauschinger effect becomes remarkable and the YS after ERW forming falls. For this reason, the inventors considered controlling the content of the ferrite and refining the ferrite structure. Further, from the viewpoint of securing strength, the inventors discovered that by relatively raising the amount of C and further by adjusting the carbon equivalent (Ceq) to a suitable value, it is possible to secure strength. They discovered that by the combined action of these, it is possible to obtain steel plate which has a high yield ratio while having high TS.

Dual-phase steel is work-hardened during plastic deformation by dislocations being introduced into the softening phase around the hard phase. For this reason, if controlling the deformation of the hard phase, the buildup of dislocations at the soft phase is promoted and the work-hardening rate can be raised. Furthermore, by refining the ferrite of the soft phase, the work-hardening rate can be raised and the Bauschinger effect can be suppressed, so strength of the steel pipe after ERW forming can also be improved. Furthermore, the control of cooling after hot rolling for obtaining the above structure can also be applied to steel plate with a relatively high plate thickness.

[1] Electric-resistance welded steel pipe comprised of steel having a chemical composition which contains, by mass %, respectively C: 0.08 to 0.18%,
Si: 0.01% to 0.50%,
Mn: 1.30 to 2.1%,
Al: 0.001 to 0.10%,
Nb: 0.005 to 0.08%, and
Ti: 0.005 to 0.03%, is limited to
N: 0.008% or less,
P: 0.020% or less, and
S: 0.010% or less, and
has a balance of Fe and unavoidable impurities, wherein a structure at a center part of thickness is 40% to 70% by area of ferrite phase having a circle-equivalent diameter of 1.0 µm to 10.0 µm and a balance of a low temperature transformation phase comprising a bainite phase, and
a Ceq expressed by the following formula (1) satisfies 0.32≤Ceq≤0.60:

$$Ceq=C+Mn/6+(Cr+Mo+V)/5+(Cu+Ni)/15 \quad \text{formula (1)}$$

where the "C", "Mn", "Cr", "Mo", "V", "Cu", and "Ni" in formula (1) are values expressing the contents of the respective elements by mass % and where when these elements are not included, the elements are calculated as 0.

[2] Electric-resistance welded steel pipe according to [1] wherein said chemical composition further contains, by mass %, one or more of
V: 0.08% or less,
Cu: 0.5% or less,
Ni: 0.5% or less,
Cr: 0.5% or less,
Mo: 0.5% or less,
Ca: 0.005% or less, and
REM: 0.005% or less.

[3] Electric-resistance welded steel pipe according to [1] or [2] wherein said chemical composition further is limited to, by mass %,
B: 0.0004% or less.

[4] Electric-resistance welded steel pipe according to [1] or [2] wherein a yield strength according to a tensile test in a longitudinal direction using a full thickness test piece is 758 MPa to 965 MPa in strength.

[5] Electric-resistance welded steel pipe according to [1] or [2] wherein a yield ratio according to a tensile test in a longitudinal direction using a full thickness test piece is 85 to 95%.

[6] Electric-resistance welded steel pipe according to [1] or [2] wherein there is no yield elongation in a stress-strain curve of a tensile test.

[7] Electric-resistance welded steel pipe according to [1] or [2] wherein the thickness is 7 to 12.7 mm.

Advantageous Effects of Invention

According to the present invention, it is possible to provide electric-resistance welded steel pipe which has a strength equivalent to P110 and a yield stress even containing non-boron or in a state of being as-formed into a pipe and a method for production of the electric-resistance welded steel pipe.

BRIEF DESCRIPTION OF DRAWINGS

FIG. 1A shows the results of observation of electric-resistance welded steel pipe of the present invention by a high-resolution crystal orientation analysis method, while

FIG. 2A shows the results of observation of electric-resistance welded steel pipe of the present invention by a high-resolution crystal orientation analysis method, while

FIG. 3A shows the results of observation of electric-resistance welded steel pipe of the present invention by a high-resolution crystal orientation analysis method, while

DESCRIPTION OF EMBODIMENTS

Figure 1A:
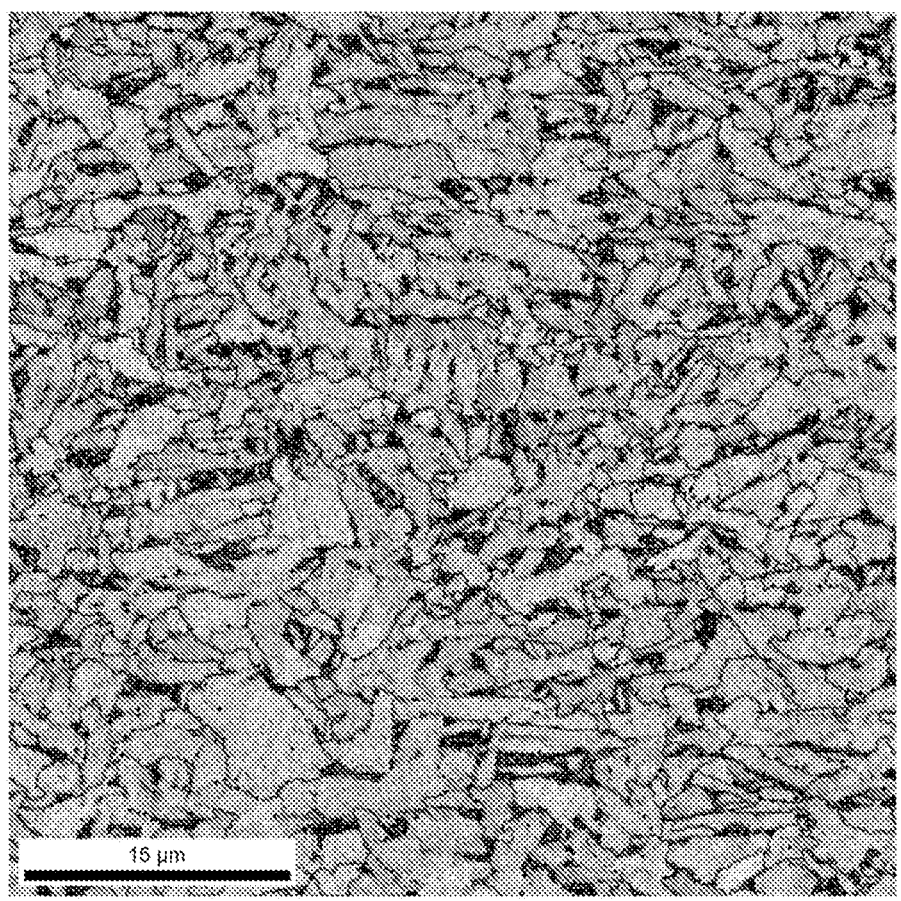

Below, the electric-resistance welded steel pipe of the present invention and the method of production thereof will be explained in detail.

First, the chemical composition of the electric-resistance welded steel pipe of the present invention will be explained. The chemical composition of the hot rolled steel plate which is used as the material of the electric-resistance welded steel pipe is the same as the chemical composition of the electric-resistance welded steel pipe. Below, "%" will express "mass %" unless otherwise indicated.

C: 0.08 to 0.18%

C is effective for improving strength. By increasing the amount of C which is added to the steel, the steel can be raised in strength, so the lower limit of the content of C is made 0.08%. On the other hand, if the amount of C exceeds 0.18%, the strength of the steel becomes too high and the toughness is degraded, so the upper limit is made 0.18%. Further, from the viewpoint of securing a strength equivalent to P110, the lower limit of the amount of C is preferably made 0.1% or more. From the viewpoint of not causing the strength to excessively rise and securing the toughness, the upper limit of the amount of C is preferably 0.17%, more preferably 0.16%. To reliably secure the toughness, the amount of C is preferably 0.15% or less.

Si: 0.01 to 0.50%

Si is effective as a deoxidizing agent. To obtain the effect as a deoxidizing agent, addition of 0.01% or more is preferable. Further, Si is an element which raises strength by solid solution strengthening, so addition of 0.05% or more is more preferable and addition of 0.10% or more is still more preferable. If Si is added in over 0.50%, not only the low temperature toughness but also furthermore electric-resistance weldability is impaired, so the upper limit is made 0.50%. From the viewpoint of securing the toughness, the amount of Si is preferably 0.40% or less, more preferably 0.30% or less.

Mn: 1.3 to 2.1%

Mn is an element which raises the hardenability of steel. In the present invention, to secure strength, 1.30% or more of Mn is added. However, if excessively adding Mn, formation of martensite is promoted and the toughness is degraded, so the upper limit is specified to be 2.10%. From the viewpoint of securing the strength, the amount of Mn is preferably 1.40% or more, more preferably 1.50% or more. From the viewpoint of securing the toughness, the amount of Mn is preferably 2.0% or less, more preferably 1.90% or less.

Al: 0.001 to 0.10%

Al is effective as a deoxidizing agent. To obtain the effect as a deoxidizing agent, addition of 0.001% or more is preferable. To raise the effect of deoxidation, addition of 0.005% or more of Al is preferable, while addition of 0.01% or more is more preferable. If adding Al in an amount exceeding 0.10%, inclusions increase and it detracts from the ductility and the toughness, so the addition of Al is suppressed to 0.10% or less. From the viewpoint of securing the toughness, the amount of Al is preferably 0.06% or less.

Nb: 0.005 to 0.08%

Nb is an element which lowers the recrystallization temperature. When performing hot rolling, it suppresses the recrystallization of austenite and contributes to refinement of the structure, so 0.005% or more is added. If adding Nb in an amount exceeding 0.08%, coarse precipitates cause the toughness to deteriorate, so the content is 0.08% or less. From the viewpoint of securing the toughness, the upper limit is preferably 0.07%, more preferably the upper limit is 0.05%. On the other hand, the lower limit makes the effect of refinement of the structure more reliable, so the lower limit is preferably 0.008%, more preferably 0.010%, still more preferably 0.015%.

Ti: 0.005 to 0.030%

Ti forms fine nitrides (TiN), suppresses coarsening of the austenite grains at the time of slab heating, and contributes to refinement of the structure. To obtain this effect, 0.005% or more of Ti is added. If excessively adding Ti in an amount exceeding 0.030%, coarsening of the TiN and precipitation hardening due to TiC occur and the toughness is degraded, so the upper limit is specified to be 0.030%. From the viewpoint of refining the structure and securing the toughness, the preferable amount of Ti is 0.008% or more, while more preferable amount is 0.010% or more. From the viewpoint of suppressing the drop in toughness due to precipitates, the amount of Ti is preferably 0.025% or less, more preferably 0.020% or less.

N: 0.008% or less

N is unavoidably present in steel, but if the amount of N is too great, the TiN and AlN excessively increase and surface defects, deterioration of toughness, and other problems are liable to occur. For this reason, the upper limit is specified to be 0.008%. Furthermore, from the viewpoint of suppressing the formation of inclusions, the upper limit of the amount of N is preferably 0.007%, more preferably the upper limit is 0.006%. The lower limit is not particularly set, but if considering the cost of removal of N and economy, is preferably specified to be 0.002%.

P: 0.02% or less

P is an impurity. The upper limit of content is 0.02%. By reducing the amount of P, the toughness is improved, so the amount of P is preferably 0.015% or less, more preferably 0.010% or less. The amount of P is preferably small, so no lower limit is provided. In view of the balance of the properties and cost, the amount is usually 0.001% or more.

S: 0.010% or less

S is an impurity. The upper limit of content is specified to be 0.010%. By reducing the amount of S, the MnS which is flattened by the hot rolling can be reduced and the toughness can be improved, so the amount of S is preferably 0.003% or less, more preferably 0.002% or less. The amount of S is preferably small, so no lower limit is provided. In view of the balance of the properties and cost, the amount is usually 0.001% or more.

In the present invention, furthermore, to raise the hardenability of the steel and improve the strength, one or more of V, Ni, Cu, Cr, Mo, Ca, and REM can be added. In the following explanation, the preferable lower limit values are described, but these are the preferable lower limit values for obtaining the effect of improvement of hardenability and increase of strength by the addition of these elements. The contents of these elements do not have a detrimental effect on the steel even if less than the preferable lower limit values.

V: 0.08% or less

V is an element which forms carbides and nitrides and improves the strength of the steel by precipitation strengthening. To cause the strength to effectively rise, it is preferable to add 0.01% or more. If excessively adding V, the carbides and nitrides coarsen and a deterioration of toughness is caused, so the upper limit of the amount of V is made 0.08%, more preferably 0.05%.

Cu: 0.50% or less

Cu is an element which improves the hardenability of steel. It contributes to solid solution strengthening as well, so Cu may be added in an amount of 0.05% or more. If excessively adding Cu, the surface texture of the steel plate is sometimes impaired, so the upper limit is specified to be 0.50% or less. From the viewpoint of economy, the more preferable upper limit of the amount of Cu is 0.30% or less. If adding Cu, from the viewpoint of preventing degradation of the surface texture, simultaneously Ni is preferably added.

Ni: 0.50% or less

Ni is an element which improves the hardenability of steel. It contributes to improvement of the toughness as well. To improve the strength, the amount of Ni is preferably 0.05% or more. Further, Ni is an expensive element, so the upper limit is specified to be 0.50% or less, and is preferably specified to be 0.30% or less.

Cr: 0.50% or less

Cr is an element which is effective for improvement of the strength. It is preferable to add 0.05% or more. If excessively adding Cr, the electric-resistance welding ability sometimes deteriorates, so the upper limit is specified to be 0.5%, is preferably specified to be 0.2% or less.

Mo: 0.50% or less

Mo is an element which contributes to the higher strength of steel. It is preferable to add 0.05% or more. However, Mo is an expensive element. The upper limit is specified to be 0.50%. The more preferable upper limit of the amount of Mo is 0.30% or less, still more preferably 0.10% or less.

Ca: 0.005% or less and REM: 0.005% or less

Ca and an REM control the form of sulfide-based inclusions, improve the low temperature toughness, and furthermore refine the oxides at the electric-resistance welded weld zone to improve the toughness of the electric-resistance welded weld zone, so one or both are preferably added in 0.001% or more. If excessively adding Ca or an REM, the oxides and sulfides become larger and have a detrimental effect on the toughness, so the upper limit of the amount of addition is specified to be 0.005%. Here, "REM" is a generic name for Sc, Y, La, Ce, Pr, Nd, Pm, Sm, Eu, Gd, Tb, Dy, Ho, Er, Tm, Yb, and Lu.

In the present invention, B is not an element which is intentionally added. It enters as an unavoidable impurity which is contained in the starting materials. Its content is limited to 0.0004% or less.

Ceq: 0.32 to 0.60

The carbon equivalent Ceq is an indicator of the hardenability and is sometimes used as an indicator of strength. It is calculated from the contents of C, Mn, Cr, Mo, V, Ni, and Cu (mass %) by the following formula (1). To secure the strength, Ceq needs to be 0.32 or more. To secure toughness, Ceq needs to be 0.60 or less. To ensure these effects, the lower limit of Ceq is preferably 0.35 or more, more preferably 0.4 or more. The upper limit of Ceq is preferably 0.50 or less, more preferably 0.45 or less.

$$Ceq = C + Mn/6 + (Cr + Mo + V)/5 + (Cu + Ni)/15 \tag{1}$$

Here, "C", "Mn", "Cr", "Mo", "V", "Ni", and "Cu" are the contents of the respective elements (mass %). Note that, Cr, Mo, V, Ni, and Cu are elements which are selectively added in the present invention. When these elements are not contained, in the above formula (1), these elements are calculated as "0".

The balance of the chemical composition of the electric-resistance welded steel pipe according to the present invention other than what is explained above is comprised of iron and unavoidable impurities. The "unavoidable impurities" are the chemical components which are included in the starting materials or which enter in the process of production and which are not intentionally included in the steel.

Specifically, P, S, O, Sb, Sn, W, Co, As, Mg, Pb, Bi, B, and H may be mentioned. Among these, P and S, as explained above, have to be controlled respectively to 0.02% or less and 0.010% or less. O is preferably controlled to 0.006% or less.

Regarding the other elements, usually Sb, Sn, W, Co, and As are 0.1% or less, Mg, Pb, and Bi are 0.005% or less, and B and H might be contained at an amount of 0.0004% or less as unavoidable impurities, but if in the usual ranges, do not have to be particularly controlled.

Further, the required or optional added elements in the steel pipe of the present invention such as Si, Al, Ni, Cu, Cr, Mo, V, Ca, and REM might be contained as unavoidable impurities even if not intentional. However, so long as the contents of the required or optional added elements are not more than the above-mentioned upper limit of content in the case of being intentionally added, the required or optional added elements do not have an adverse effect on the steel pipe of the present invention, so it does not cause any problem. Further, N is generally sometimes treated as an unavoidable impurity in the steel, but in the electric-resistance welded steel pipe of the present invention, as explained above, has to be controlled so as to be within the constant range.

Next, the metal structure of the electric-resistance welded steel pipe of the present invention will be explained.

The electric-resistance welded steel pipe according to the present invention has a structure mainly comprised of ferrite and a low temperature transformation phase such as bainite. In the present invention, B is not added, so ferrite is easily formed. The properties of that ferrite are utilized to secure the toughness while the ferrite phase is made to be finer to secure the yield strength. The overall strength is secured by controlling the C content and the Ceq. Note that the following structure indicates the structure of the center part of thickness of the electric-resistance welded steel pipe. The "center part of thickness" indicates the part corresponding to a depth of ¼ to ¾ of the plate thickness from the steel pipe surface in the cross-section of the steel plate of the steel pipe.

The ferrite phase which forms the electric-resistance welded steel pipe of the present invention has a circle-equivalent diameter of 1.0 μm to 10.0 μm. If the circle-equivalent diameter of the ferrite phase becomes less than 1.0 μm, the ferrite phase no longer contributes to an increase of the yield ratio. The lower limit is preferably made 2.0 μm or more. On the other hand, if the circle-equivalent diameter of the ferrite phase becomes over 10.0 μm, the Bauschinger effect becomes remarkable, the YR after ERW forming becomes lower, and the low temperature toughness is degraded. The upper limit of the circle-equivalent diameter of the ferrite phase is preferably 7 μm, more preferably 6 μm, to ensure the effect, still more preferably may be 5.0 μm.

Further, the area rate of the ferrite phase has to be 40% or more to secure the toughness and improve the yield ratio. The preferable lower limit of the area rate of the ferrite phase is 45%, while the more preferable lower limit is 50%. On the other hand, if the area rate of the ferrite phase is too high, the strength cannot be secured, so in view of a comparison with the P110 standard, the upper limit is specified to be 70%. From the viewpoint of securing the strength, the upper limit is preferably 65%, more preferably 60%.

Further, in the electric-resistance welded steel pipe of the present invention, a balance other than ferrite is comprised of a low temperature transformation phase comprising mainly bainite. Furthermore, it sometimes also contains a residual austenite phase or martensite. The area rate of the bainite phase is preferably 90% or more of the balance other than the ferrite phase. The residual austenite is unstable and lowers the yield stress, so should be made to be as low as possible. Further, martensite also causes the toughness to fall if increased, so should be made as small as possible. For this reason, the upper limits of the area rates of both the residual austenite and the martensite are specified to be 1%. More preferably, they are 0.5% or less. If possible, it is desirable that these not be present.

The states of distribution and area rates of the ferrite phase, bainite phase, residual austenite phase, martensite phase, etc. can be acquired by high resolution crystal orientation analysis (below, referred to as the "EBSP method") and image analysis by software such as KAM.

Figure 1B:
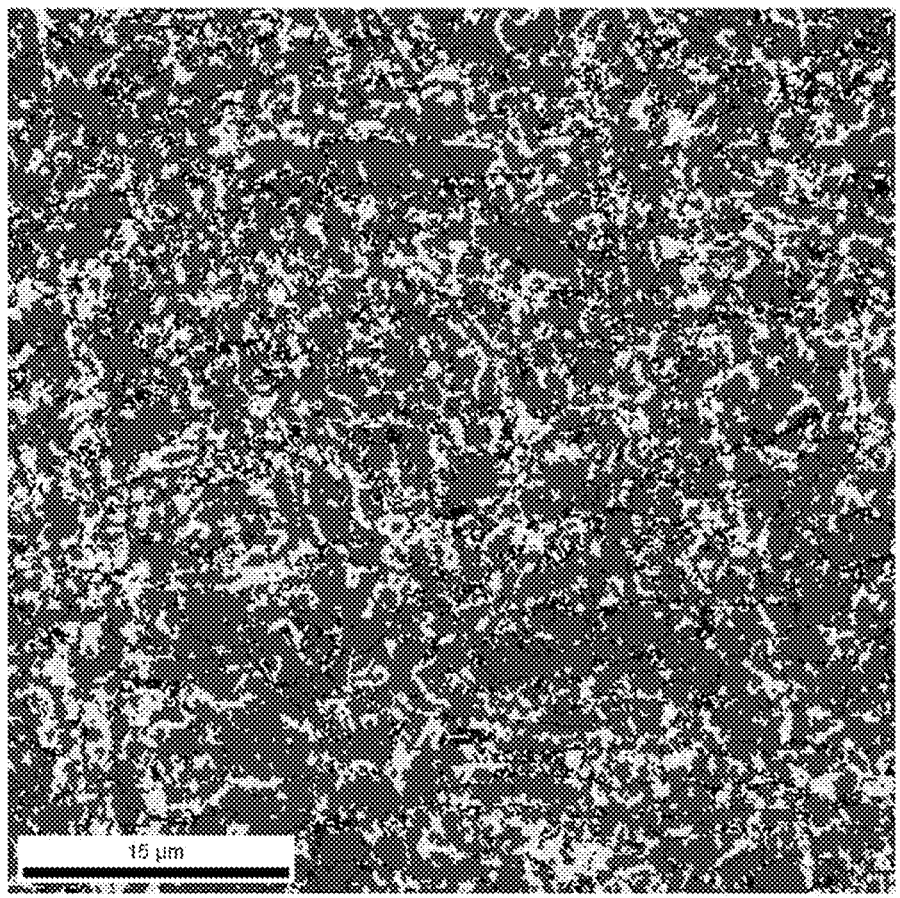
FIG. 1B is a phase diagram of distribution of ferrite obtained by image analysis of the results of observation.
Figure 2A:
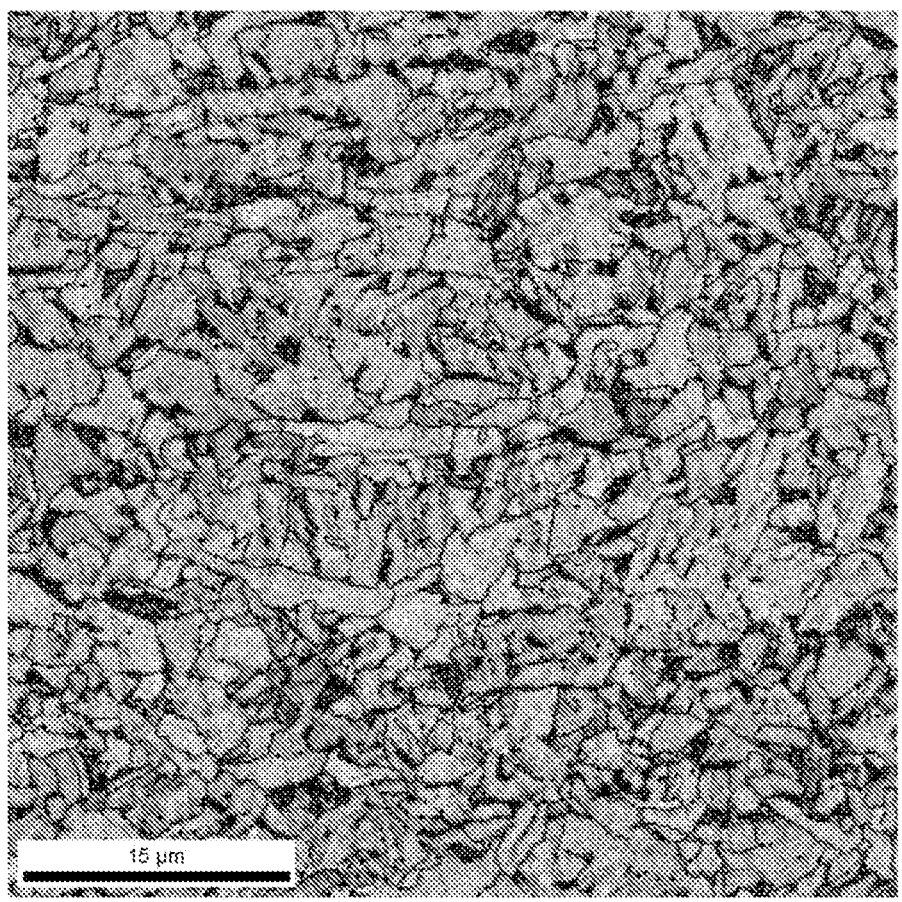
Figure 2B:
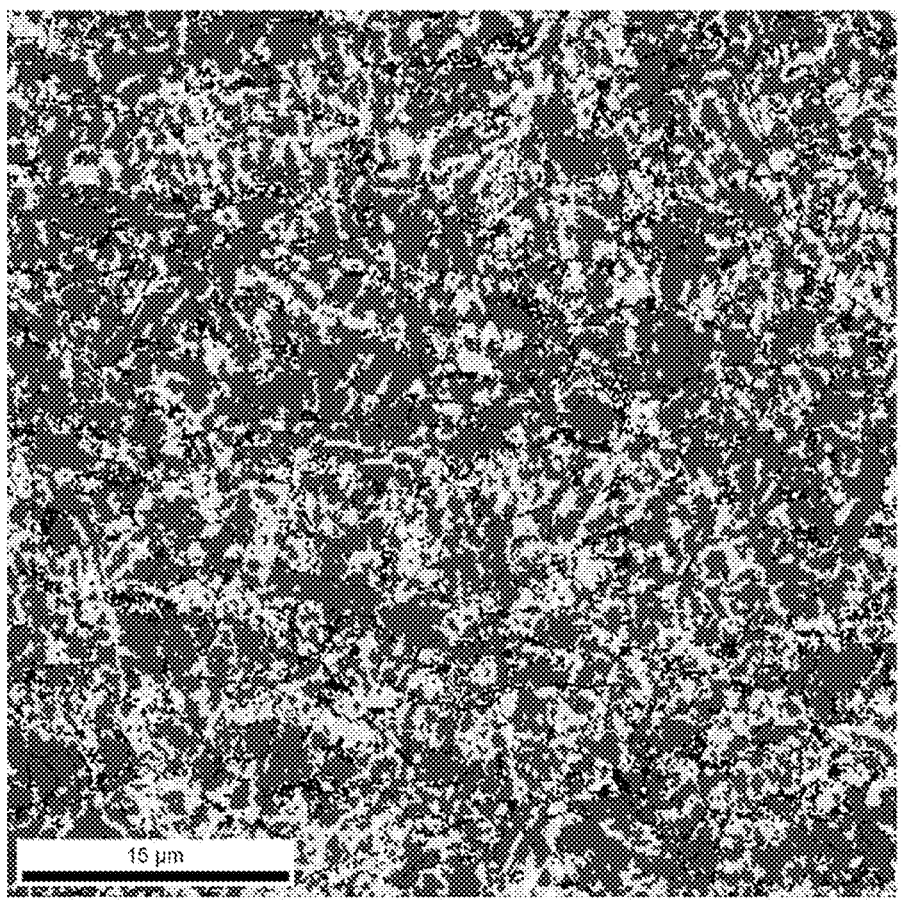
FIG. 2B is a phase diagram of distribution of ferrite obtained by image analysis of the results of observation.
Figure 3A:
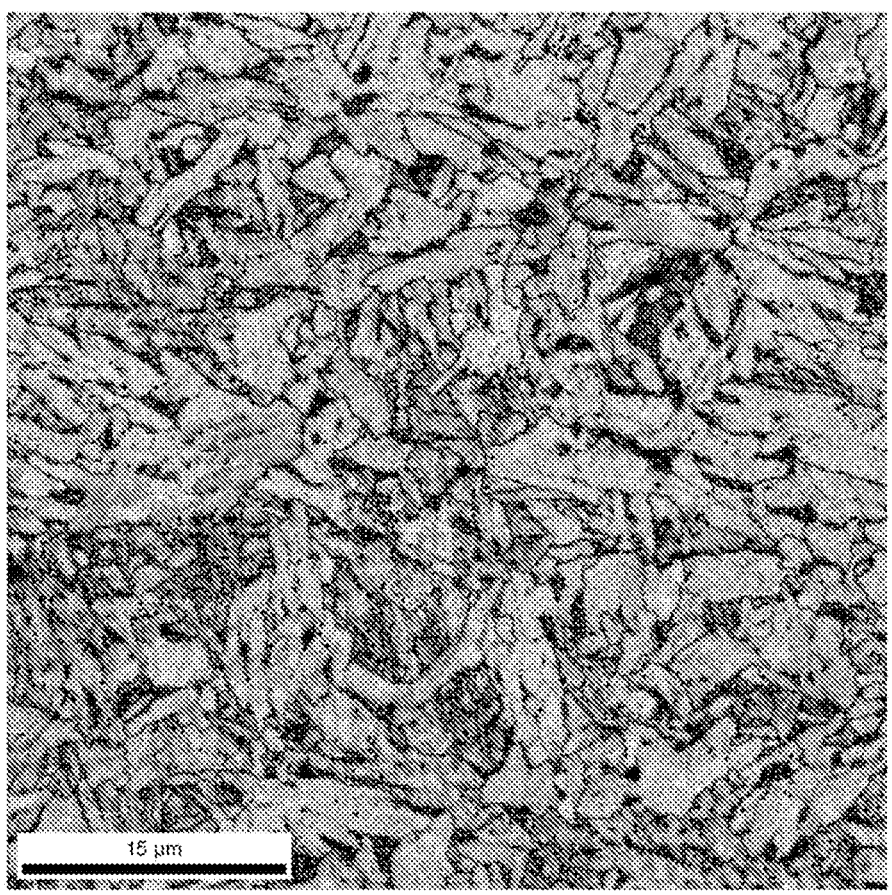
Figure 3B:
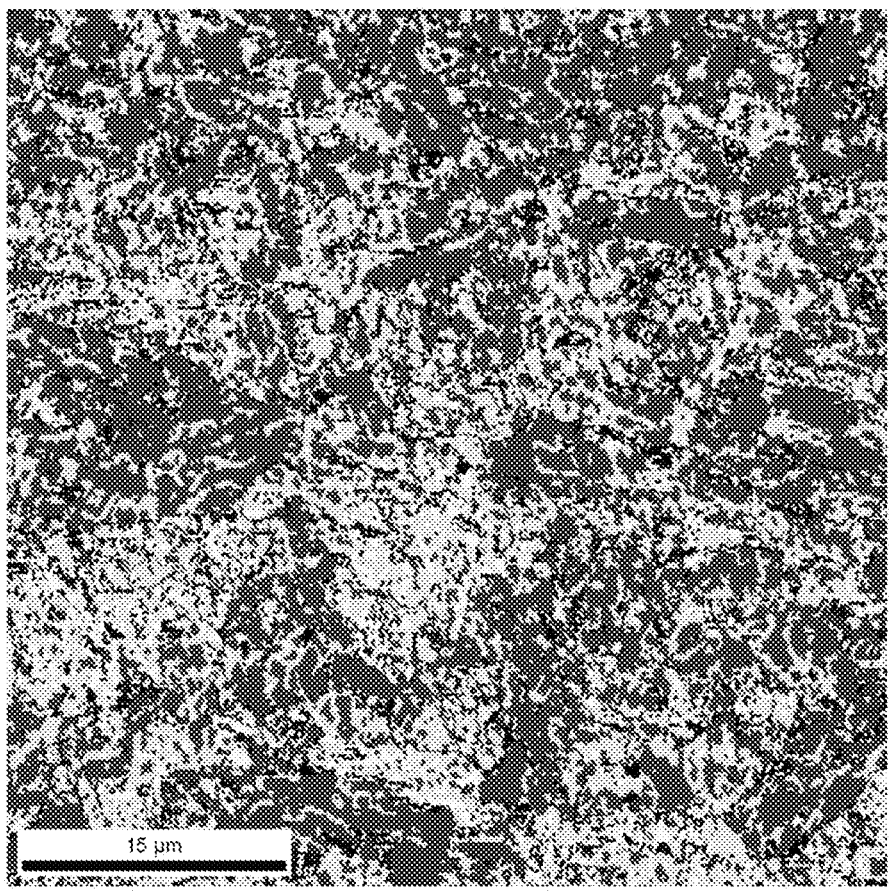
FIG. 3B is a phase diagram of distribution of ferrite obtained by image analysis of the results of observation.

FIG. 1A, FIG. 2A, and FIG. 3A show the results of observation of the electric-resistance welded steel pipes T1 to T3 of the present invention by the EBSP method. The results of image analysis by the software KAM on FIG. 1A, FIG. 2A, and FIG. 3A are shown in FIG. 1B, FIG. 2B, and FIG. 3B. The area rate of the ferrite can be found from this image analysis. The ferrite phases correspond to the areas which have a less than 1° difference in orientation by the KAM method and are represented in the image colored.

FIG. 1A, FIG. 2A and FIG. 3A respectively are the EBSP method images of the electric-resistance welded steel pipes T1 to T3 of the present invention which are produced under the manufacturing conditions of the amounts of Mn and finishing temperatures of the hot rolling which are shown in Table 1-1. FIG. 1B, FIG. 2B, and FIG. 3B are the results of image analysis of FIG. 1A, FIG. 2A, and FIG. 3A by the KAM.

TABLE 1-1

| Electric | | Manufacturing conditions | |
| --- | --- | --- | --- |
| resistance welded steel pipe | Image | Amount of addition of Mn (mass %) | Finishing temperature of hot rolling (° C.) |
| T1 | FIGS. 1A and 1B | 1.7 | 830 |
| T2 | FIGS. 2A and 2B | 1.9 | 830 |
| T3 | FIGS. 3A and 3B | 1.9 | 900 |

The hardness and TS of the electric-resistance welded steel pipes T1 to T3 of the present invention and the ferrite fraction (%) and average ferrite grain size measured based on image analysis of FIG. 1B, FIG. 2B, and FIG. 3B are shown in Table 1-2.

TABLE 1-2

| Electric resistance welded steel pipe | Hardness (Hv) | TS (MPa) | Ferrite fraction (%) | Average ferrite grain size (μm) |
| --- | --- | --- | --- | --- |
| T1 | 275 | 875 | 63.0 | 4.5 |
| T2 | 283 | 900 | 53.0 | 4.5 |
| T3 | 296 | 940 | 44.9 | 3.5 |

Note that, the area rates of the martensite phase and residual austenite of FIG. 1B, FIG. 2B, and FIG. 3B were measured. As a result, both the martensite phase and the residual austenite had area rates of 1% or less. It was confirmed that if both the martensite phase and the residual austenite have area rates of 1% or less, there is no effect on the properties of the electric-resistance welded steel pipe of the present invention.

The yield ratio was calculated using the yield strength YS and tensile strength TS acquired by conducting a tensile test. The relationship between the area rate of the ferrite phase and the yield ratio was investigated. As a result, it was confirmed that if the area rate of the ferrite phase becomes less than 40%, the yield ratio becomes over 95% and the toughness remarkably falls. Further, it was confirmed that if the area rate of the ferrite phase exceeds 70%, the yield strength falls and the yield ratio falls to less than 85%. Furthermore, it was confirmed that if the area rate of the ferrite phase is over 70%, not only the yield strength, but also the tensile strength falls and a P110 equivalent strength can no longer be obtained.

The electric-resistance welded steel pipe of the present invention contains a fine ferrite phase of a circle-equivalent diameter of 1.0 μm to 10.0 μm in an area rate of 40% to 70%, so the Bauschinger effect can be suppressed, the yield strength can be raised, and a yield ratio of 85 to 95% can be secured. Further, the electric-resistance welded steel pipe of the present invention was confirmed to have no yield elongation in the stress-strain curve of a tensile test.

Next, the method of production of the electric-resistance welded steel pipe of the present invention will be explained. First, the manufacturing conditions of the hot rolled steel plate which is used as the material of the electric-resistance welded steel pipe of the present invention will be explained.

In the present invention, the steel having the above-mentioned chemical composition is heated and hot rolled, then cooled by controlled cooling and coiled to produce hot rolled steel plate.

The heating temperature of the steel is preferably 1150° C. or more so as to dissolve the Nb and other elements which form carbides in the steel. On the other hand, to obtain a microstructure of fine grains, 1000 to 1250° C. is desirable. If the heating temperature is too high, the structure becomes coarse, so to prevent coarsening of the grain size of the ferrite, 1250° C. or less is preferable.

The hot rolling has to be performed in a temperature region where the structure of the steel becomes an austenite phase. This is because if rolling after the ferrite transformation is started, deformed ferrite is produced and the anisotropy of the characteristics becomes greater. Therefore, the finishing temperature of the hot rolling is preferably the $Ar_3$ where ferrite transformation is started at the time of cooling or more. If the finishing temperature is too high, the structure becomes coarse, so the upper limit of the finishing temperature of the hot rolling is preferably 1000° C.

The $Ar_3$ can be acquired from the thermal expansion behavior at the time of heating and cooling using a test material of the same chemical composition as the hot rolled steel plate. Further, it can be acquired by the following formula (2) from the chemical composition of the hot rolled steel plate:

$$Ar_3(° C.)=910-310C-80Mn-55Ni-20Cu-15Cr-80Mo \quad (2)$$

Here, "C", "Mn", "Ni", "Cu", "Cr", and "Mo" are the contents of the respective elements (mass %). Ni, Cu, Cr, and Mo are optional added elements in the present invention. If these elements are not intentionally added, they are calculated as "0" in the above formula (2).

In hot rolling, to make the ferrite structure of the steel finer, the austenite grains have to be made to be finer. For this reason, the reduction ratio at 950° C. or less is preferably set to 70% or more. Depending on the thickness of the steel to be rolled, the reduction ratio at 950° C. or less is acquired as a percentage by dividing the difference between the plate thickness at 950° C. and the plate thickness after final rolling by the plate thickness after final rolling. If the rolling finishing temperature (FT) is below $Ar_3$, the ferrite is worked and the anisotropy of the steel plate becomes greater, so the FT is $Ar_3$ or more.

For the purpose of obtaining a suitable amount of ferrite after hot rolling and obtaining a balance of a bainite phase, two-stage controlled cooling having the vicinity of 650° C. where the bainite transformation starts as the intermediate point is performed. This is because by forming ferrite in the former stage of cooling and raising the cooling rate at the latter stage, mainly a bainite phase structure is obtained. First, in the former stage of cooling, after the end of the final rolling of the hot rolling, the cooling is desirably performed by an average cooling rate of 10 to 25° C./s from the $Ar_3$ temperature to 650° C. If the temperature becomes too low after hot rolling, coarse polygonal ferrite is formed, the strength falls, and the toughness deteriorates, so the water cooling is desirably performed from the FT-50° C. or more.

In the second stage of the cooling process, the average cooling rate from 650° C. to 300° C. may be set to 15° C./s or more. Due to this, it is possible to promote the transformation of bainite and secure strength. On the other hand, if the cooling rate of the second stage is set to excessively fast, the strength becomes excessively high and deterioration of toughness is caused, so the upper limit of the cooling rate is 50° C./s. Preferably, it is 40° C./s, more preferably 30° C./s. The cooling rate of the latter stage may be set to 1.5 times or more of the former stage cooling rate, preferably 2 times or more.

The end temperature of the cooling process is the bainite transformation temperature or less, that is, 300° C. or less. This aim is to obtain a suitable amount of a bainite phase. After cooling, the steel plate is coiled at 300° C. or less. If making the coiling temperature over 300° C., the transformation becomes insufficient, granular bainite is formed, and there is possibility that a sufficient strength is not obtained. Therefore, in the present invention, the coiling temperature of the hot rolled steel plate is 300° C. or less. The lower limit may be room temperature.

Next, in the present invention, the obtained hot rolled steel plate is air-cooled and formed into a tube shape by cold rolling, then the end parts are abutted mutually and welded by electric-resistance welding to produce electric-resistance welded steel pipe. The present invention does not specifically limit the thickness or outer shape of the electric-resistance welded steel pipe. However, the present invention can be applied well to steel pipe which has a ratio t/D of thickness "t" of the steel plate and outside diameter D of the electric-resistance welded steel pipe of about 2.0 to 6.0% and has a "t" of 7 mm to 12.7 mm.

Furthermore, heat treatment of seam which heats only the electric-resistance welded weld zone and cools it at an accelerated rate may be applied to the electric-resistance welded weld zone. In electric-resistance welding, the abutted parts are heated to be melted and pressure is applied for solid-state welding of the abutted parts, so the vicinity of the electric-resistance welded weld zone plastically deforms at a high temperature, then is rapidly cooled. For this reason, the electric-resistance welded weld zone becomes harder than the steel plate. Heat treating the seam further can improve the low temperature toughness and deformability of the electric-resistance welded steel pipe.

EXAMPLES

Below, the advantageous effects of the present invention will be specifically explained by examples. Note that, the present invention is not limited to the conditions used in the following examples. Further, fields in the tables with "zero" figures indicate the elements are not intentionally added. The Steels A to L are steels which satisfy the requirements of the chemical composition of the present invention, while the Steels AA to AD are steels which do not satisfy the requirements of the chemical composition of the present invention.

Steels A to L and AA to AD which have the chemical compositions which are shown in Table 2-1 and Table 2-2 were cast to obtain steel slabs. These steel slabs were heated to the heating temperatures which are shown in Table 3-1 and Table 3-2, were hot rolled at a reduction ratio of 1000° C. or less and finishing temperature (FT in Table 3-1 and Table 3-2), and were cooled to obtain hot rolled steel plates. The cooling process was performed in two-stage cooling operation which changes the cooling rate at the medium temperature (in Table 3-1 and Table 3-2, MT). The cooling rate in the latter stage (MT or less) was made to become not less than 1.5 times the average cooling rate of the former stage (from cooling start temperature to MT). After the cooling step, the steel plate was coiled up at the coiling temperature (CT) which is shown in Table 3-1 and Table 3-2 to obtain the hot rolled steel plate.

Next, the obtained hot rolled steel plate was air cooled, then was shaped into a tube by a successive roll-forming process. The end parts of the hot rolled steel plate were abutted against each other and welded by electric-resistance welding. After that, as required, heat treatment of seam which heated the electric-resistance welded weld zone and then cooled it by accelerated cooling was applied to the electric-resistance welded weld zone.

In Table 3-1 and Table 3-2, the "reduction ratio" is the reduction ratio at 950° C. or less in the hot rolling process. Further, "t" shows the thickness (mm) of the steel plate, while "D" shows the outside diameter (mm) of the steel pipe after pipe-making.

The $Ar_3$ of Table 2-1 and Table 2-2 were calculated from the contents (mass %) of C, Mn, Ni, Cu, Cr, and Mo. Note that, Ni, Cu, Cr, and Mo are optionally added elements in the present invention. As shown by the fields in Table 2-1 and Table 2-2, when intentionally not adding these elements, they were calculated as "0" in the following formula (2).

$$Ar_3(°\text{C.}) = 910 - 310C - 80Mn - 55Ni - 20Cu - 15Cr - 80Mo \quad (2)$$

Next, from the produced electric-resistance welded steel pipe, a sample for observation of structure was taken. the cross-section parallel to the longitudinal direction of the steel pipe was subjected to nital etching and was observed for structure and photographed by an optical microscope. The observed position was set to a 2t/5 position from the outer surface. These structural photographs were used to confirm that pearlite, martensite, and other structures other than a ferrite phase or bainite phase were not formed. After that, an image observed by the EBSP method was analyzed to calculate the area rate of the ferrite phase. For the area rate of the ferrite phase, ten fields of 100 μm×200 μm were measured and the average value was calculated. Furthermore, X-ray diffraction was used to measure the area rate of austenite whereby it was confirmed to be 1% or less.

Next, from the obtained electric-resistance welded steel pipe, based on JIS Z 2241, an arc shaped tensile test piece was taken in the longitudinal direction of the steel pipe, and then this was subjected to a tensile test at room temperature to find the yield stress and the tensile strength. The results are shown in Table 4.

TABLE 2-1

| Steel | C | Si | Mn | P | S | Al | N | Nb | V | Ti | Cu | Ni | Cr | Mo | Ca | REM | Ceq | $Ar_3$ |
|---|---|---|---|---|---|---|---|---|---|---|---|---|---|---|---|---|---|---|
| A | 0.12 | 0.23 | 1.44 | 0.018 | 0.003 | 0.001 | 0.002 | 0.050 | 0.000 | 0.005 | 0.000 | 0.00 | 0.000 | 0.00 | 0.0000 | 0.000 | 0.360 | 758 |
| B | 0.08 | 0.1 | 1.55 | 0.007 | 0.001 | 0.060 | 0.008 | 0.030 | 0.000 | 0.019 | 0.200 | 0.20 | 0.000 | 0.00 | 0.0000 | 0.000 | 0.365 | 746 |
| C | 0.10 | 0.02 | 1.60 | 0.015 | 0.003 | 0.030 | 0.003 | 0.019 | 0.000 | 0.009 | 0.000 | 0.00 | 0.000 | 0.10 | 0.0000 | 0.000 | 0.387 | 743 |
| D | 0.11 | 0.22 | 1.80 | 0.020 | 0.002 | 0.039 | 0.004 | 0.040 | 0.045 | 0.012 | 0.000 | 0.00 | 0.000 | 0.00 | 0.0032 | 0.000 | 0.419 | 732 |
| E | 0.12 | 0.25 | 1.90 | 0.014 | 0.001 | 0.032 | 0.003 | 0.050 | 0.000 | 0.015 | 0.000 | 0.00 | 0.000 | 0.00 | 0.0025 | 0.000 | 0.437 | 721 |
| F | 0.13 | 0.03 | 1.76 | 0.01 | 0.002 | 0.015 | 0.003 | 0.048 | 0.000 | 0.030 | 0.000 | 0.00 | 0.000 | 0.08 | 0.0002 | 0.003 | 0.439 | 723 |
| G | 0.13 | 0.26 | 1.90 | 0.01 | 0.002 | 0.015 | 0.003 | 0.010 | 0.048 | 0.018 | 0.000 | 0.19 | 0.1 | 0.10 | 0.0000 | 0.000 | 0.509 | 698 |
| H | 0.14 | 0.23 | 1.89 | 0.009 | 0.002 | 0.021 | 0.003 | 0.047 | 0.000 | 0.019 | 0.000 | 0.28 | 0.000 | 0.31 | 0.0000 | 0.005 | 0.536 | 675 |
| I | 0.15 | 0.3 | 2.00 | 0.01 | 0.002 | 0.018 | 0.003 | 0.053 | 0.000 | 0.020 | 0.31 | 0.00 | 0.000 | 0.00 | 0.0000 | 0.000 | 0.504 | 697 |
| J | 0.13 | 0.25 | 1.70 | 0.01 | 0.001 | 0.014 | 0.003 | 0.045 | 0.000 | 0.014 | 0.000 | 0.00 | 0.34 | 0.00 | 0.0004 | 0.005 | 0.481 | 729 |
| K | 0.17 | 0.4 | 2.00 | 0.01 | 0.001 | 0.016 | 0.003 | 0.045 | 0.035 | 0.030 | 0.000 | 0.00 | 0.000 | 0.00 | 0.0000 | 0.000 | 0.510 | 697 |
| L | 0.14 | 0.15 | 1.30 | 0.008 | 0.001 | 0.030 | 0.002 | 0.080 | 0.000 | 0.030 | 0.000 | 0.00 | 0.000 | 0.00 | 0.0000 | 0.000 | 0.357 | 763 |

TABLE 2-2

| Steel | C | Si | Mn | P | S | Al | N | Nb | V | Ti | Cu | Ni | Cr | Mo | Ca | REM | Ceq | $Ar_3$ |
|---|---|---|---|---|---|---|---|---|---|---|---|---|---|---|---|---|---|---|
| AA | 0.06 | 0.01 | 1.83 | 0.008 | 0.001 | 0.001 | 0.002 | 0.005 | 0.000 | 0.018 | 0.000 | 0.00 | 0.000 | 0.00 | 0.0000 | 0.000 | 0.365 | 745 |
| AB | 0.09 | 0.34 | 1.30 | 0.008 | 0.003 | 0.030 | 0.007 | 0.013 | 0.000 | 0.008 | 0.000 | 0.00 | 0.000 | 0.00 | 0.0000 | 0.000 | 0.307 | 778 |
| AC | 0.14 | 0.16 | 1.90 | 0.011 | 0.001 | 0.022 | 0.002 | 0.080 | 0.080 | 0.008 | 0.100 | 0.15 | 0.320 | 0.25 | 0.0030 | 0.000 | 0.603 | 680 |
| AD | 0.19 | 0.34 | 1.68 | 0.015 | 0.005 | 0.060 | 0.005 | 0.023 | 0.000 | 0.008 | 0.000 | 0.00 | 0.000 | 0.00 | 0.0000 | 0.000 | 0.470 | 717 |

TABLE 3-1

| No. | Steel | Heating temperature (° C.) | Reduction ratio (%) | t (mm) | FT (° C.) | MT (° C.) | Water cooling start temperature (° C.) | Average cooling rate until MT (° C./s) | Average cooling rate at MT or less (° C./s) | CT (° C.) | D (mm) | t/D (%) | Heat treatment after forming steel pipe |
|---|---|---|---|---|---|---|---|---|---|---|---|---|---|
| 1 | A | 1200 | 80 | 7.00 | 940 | 610 | 915 | 25.0 | 47.5 | <100 | 116.7 | 6.0 | None |
| 2 | B | 1200 | 80 | 7.00 | 931 | 610 | 906 | 25.0 | 47.5 | <100 | 116.7 | 6.0 | None |
| 3 | C | 1200 | 75 | 7.50 | 927 | 610 | 902 | 20.0 | 38.0 | <100 | 147.1 | 5.1 | None |
| 4 | D | 1200 | 75 | 9.19 | 910 | 630 | 885 | 19.0 | 38.0 | <100 | 177.8 | 5.2 | None |
| 5 | E | 1150 | 75 | 9.19 | 900 | 620 | 880 | 18.0 | 35.0 | <100 | 177.8 | 5.2 | None |
| 6 | F | 1200 | 75 | 9.50 | 894 | 630 | 874 | 13.2 | 19.8 | 150 | 211.1 | 4.5 | None |
| 7 | G | 1200 | 75 | 9.50 | 878 | 630 | 858 | 12.3 | 18.4 | 300 | 182.7 | 5.2 | None |
| 8 | H | 1200 | 75 | 10.50 | 855 | 620 | 835 | 25.0 | 37.5 | 300 | 210.0 | 5.0 | None |
| 9 | I | 1200 | 75 | 10.00 | 877 | 630 | 857 | 12.2 | 18.4 | 300 | 200.0 | 5.0 | None |
| 10 | J | 1200 | 75 | 11.50 | 862 | 620 | 842 | 11.3 | 17.0 | 200 | 217.0 | 5.3 | None |
| 11 | K | 1200 | 75 | 12.00 | 877 | 620 | 857 | 12.2 | 18.4 | 300 | 200.7 | 6.0 | None |
| 12 | L | 1200 | 75 | 12.50 | 930 | 620 | 910 | 15.4 | 23.1 | <100 | 227.3 | 5.5 | None |
| 13 | C | 1050 | 80 | 7.00 | 870 | 610 | 840 | 24.0 | 40.0 | <100 | 210.0 | 3.0 | None |
| 14 | C | 1100 | 80 | 7.00 | 900 | 620 | 861 | 20.0 | 30.0 | <100 | 210.0 | 3.0 | None |

TABLE 3-2

| No. | Steel | Heating temperature (° C.) | Reduction ratio (%) | t (mm) | FT (° C.) | MT (° C.) | Water cooling start temperature (° C.) | Average cooling rate until MT (° C./s) | Average cooling rate at MT or less (° C./s) | CT (° C.) | D (mm) | t/D (%) | Heat treatment after forming steel pipe |
|---|---|---|---|---|---|---|---|---|---|---|---|---|---|
| 20 | D | 1200 | 75 | 9.19 | 932 | 650 | 912 | 20.0 | 10.0 | 550 | 177.8 | 5.2 | None |
| 21 | J | 1200 | 60 | 12.00 | 923 | 660 | 808 | 10.0 | 28.0 | 300 | 300.0 | 4.0 | None |
| 22 | AA | 1200 | 75 | 7.00 | 889 | 650 | 869 | 20.0 | 34.0 | <100 | 116.7 | 6.0 | None |
| 23 | AB | 1200 | 75 | 7.00 | 903 | 650 | 883 | 20.0 | 34.0 | <100 | 116.7 | 6.0 | None |
| 24 | AC | 1200 | 75 | 10.50 | 876 | 650 | 856 | 20.0 | 34.0 | <100 | 205.9 | 5.1 | None |
| 25 | AD | 1200 | 75 | 10.50 | 870 | 650 | 850 | 20.0 | 34.0 | <100 | 205.9 | 5.1 | None |

TABLE 4

| No. | Ferrite area rate (%) | Bainite area rate (%) | Ferrite average circle equivalent diameter (μm) | Steel plate YS (MPa) | Steel plate TS (MPa) | Steel pipe YS (MPa) | Steel pipe TS (MPa) | YR (%) | Steel pipe elongation at yield | |
|---|---|---|---|---|---|---|---|---|---|---|
| 1 | 40.0 | 57.0 | 7.7 | 612 | 815 | 826 | 869 | 95.0 | None | Inv. ex. |
| 2 | 40.2 | 56.8 | 5.4 | 613 | 818 | 827 | 872 | 94.8 | None | |
| 3 | 40.3 | 56.7 | 5.1 | 617 | 824 | 832 | 879 | 94.7 | None | |
| 4 | 53.0 | 42.3 | 3.5 | 584 | 858 | 788 | 915 | 86.1 | None | |
| 5 | 44.9 | 50.7 | 4.5 | 600 | 871 | 847 | 945 | 89.6 | None | |
| 6 | 56.0 | 39.6 | 6.9 | 601 | 881 | 810 | 939 | 86.3 | None | |
| 7 | 56.0 | 39.6 | 6.2 | 607 | 891 | 819 | 950 | 86.2 | None | |
| 8 | 61.0 | 35.1 | 6.1 | 614 | 905 | 828 | 965 | 85.8 | None | |
| 9 | 61.0 | 35.1 | 5.6 | 609 | 897 | 822 | 957 | 85.9 | None | |
| 10 | 67.0 | 29.7 | 5.2 | 615 | 914 | 830 | 975 | 85.1 | None | |
| 11 | 68.0 | 28.8 | 5.6 | 619 | 920 | 835 | 981 | 85.1 | None | |
| 12 | 69.9 | 27.1 | 4.0 | 623 | 927 | 841 | 989 | 85.0 | None | |
| 13 | 42.1 | 57.9 | 1.6 | 647 | 870 | 849 | 901 | 94.9 | None | |
| 14 | 51 | 49 | 2.8 | 671 | 896 | 850 | 918 | 92.6 | None | |
| 20 | 83.0 | 8.5 | 9.2 | 620 | 787 | 722 | 821 | 87.9 | None | |
| 21 | 60.0 | 21.8 | 11.1 | 612 | 900 | 762 | 933 | 81.7 | None | |
| 22 | 83.0 | 8.5 | 12.0 | 469 | 770 | 682 | 821 | 83.1 | None | |
| 23 | 70.0 | 22.5 | 8.6 | 555 | 789 | 748 | 841 | 89.0 | None | |
| 24 | 37.0 | 47.3 | 8.2 | 723 | 924 | 975 | 998 | 97.7 | None | |
| 25 | 40.0 | 45.0 | 7.7 | 657 | 839 | 988 | 1068 | 92.5 | None | |

As shown in Table 4, Invention Example Nos. 1 to 14 all had metal structures which were comprised of suitable area rates of ferrite and bainite. Further, the tensile strengths of these electric-resistance welded steel pipes were all tensile strengths 758 MPa or more, while the yield ratios were all good ones of 85% to 95%.

In the case of No. 20, a coiling temperature was over 300° C. and, further, an average cooling rate at the MT or less was less than 15° C./s, so No. 20 had a higher transformation temperature. Therefore, No. 20 is an example where the area rate of the ferrite phase became excessive, while the formation of bainite became insufficient and the yield strength fell. No. 21 was water cooled from a temperature lower than FT-50° C., so a ferrite average circle-equivalent grain size of No. 21 was larger than 10 μm. Therefore, a yield ratio in the rolling direction (L direction) of No. 21 was less than 85%.

No. 22 had an amount of C lower than the range of the present invention, so the area rate of the ferrite phase became excessive. Further, the ferrite average circle-equivalent grain size exceeded 10 μm and the ferrite structure of the steel was insufficiently refined. For this reason, No. 22 did not obtain a strength of a P110 equivalent YS and had a yield ratio in the rolling direction of less than 85%.

No. 23 is an example where the Ceq is lower than the range of the present invention, so the strength was insufficient. No. 24 is an example where the Ceq is higher than the range of the present invention, so the strength excessively rose. The yield strength in the rolling direction exceeds 95%. No. 25 is an example where the content of C is higher than the range of the present invention and the strength excessively rose.

It is an object of the present invention to produce ERW steel pipe at a low cost and the present invention stipulates the conditions for satisfying the required properties in a state of being as-formed by ERW. If tempering after ERW forming, material change resulting in increasing YR greatly and causing yield elongation arises.

INDUSTRIAL APPLICABILITY

According to the present invention, it is possible to provide electric-resistance welded steel pipe which has a strength equivalent to the API standard 5CT P110 and is optimal for applications such as production of shale gas, without heat treatment after pipe manufacturing, that is, inexpensively, so the industrial applicability is great.

The invention claimed is:

1. Electric-resistance welded steel pipe comprised of steel having a chemical composition which contains, by mass %, respectively
   C: 0.08 to 0.18%,
   Si: 0.01% to 0.50%,
   Mn: 1.30 to 2.1%,
   Al: 0.001 to 0.10%,
   Nb: 0.005 to 0.08%, and
   Ti: 0.005 to 0.03%,
   is limited to
   N: 0.008% or less,
   P: 0.020% or less, and
   S: 0.010% or less, and
   has a balance of Fe and unavoidable impurities, wherein a structure at a center part of thickness is 40% to 70% by area of ferrite phase having a circle-equivalent diameter of 1.0 μm to 10.0 μm and a balance of a low temperature transformation phase comprising a bainite phase, and
   a Ceq expressed by the following formula (1) satisfies $0.32 \leq Ceq \leq 0.60$:

$$Ceq = C + Mn/6 + (Cr + Mo + V)/5 + (Cu + Ni)/15 \quad (1)$$

where the "C", "Mn", "Cr", "Mo", "V", "Cu", and "Ni" in formula (1) are values expressing the contents of the respective elements by mass % and where when these elements are not included, the elements are calculated as 0,
   wherein an area rate of the bainite phase is 90% or more of the balance other than the ferrite phase,
   wherein an area rate of a residual austenite phase is not more than 0.5%,
   wherein an area rate of a martensite phase is not more than 0.5%,
   wherein a yield strength according to a tensile test in a longitudinal direction using a tensile test piece is 758 MPa to 822 MPa in strength,
   wherein a yield ratio according to a tensile test in a longitudinal direction using the tensile test piece is 85 to 95%, and
   wherein the tensile test piece is an arc shaped tensile test piece taken from the electric-resistance welded steel pipe in the longitudinal direction thereof on the basis of JIS Z 2241.

2. Electric-resistance welded steel pipe according to claim 1 wherein said chemical composition further contains, by mass %, one or more of
   V: 0.08% or less,
   Cu: 0.5% or less,
   Ni: 0.5% or less,
   Cr: 0.5% or less,
   Mo: 0.5% or less,
   Ca: 0.005% or less, and
   REM: 0.005% or less.

3. Electric-resistance welded steel pipe according to claim 2 wherein said chemical composition further is limited to, by mass %,
   B: 0.0004% or less.

4. Electric-resistance welded steel pipe according to claim 2 wherein there is no yield elongation in a stress-strain curve of a tensile test.

5. Electric-resistance welded steel pipe according to claim 2 wherein the thickness is 7 to 12.7 mm.

6. Electric-resistance welded steel pipe according to claim 1 wherein said chemical composition further is limited to, by mass %,
   B: 0.0004% or less.

7. Electric-resistance welded steel pipe according to claim 1 wherein there is no yield elongation in a stress-strain curve of a tensile test.

8. Electric-resistance welded steel pipe according to claim 1 wherein the thickness is 7 to 12.7 mm.

* * * * *